HERMANN LUTZ.
Improvement in Folding Carriage for Children.

No. 120,757.                                               Patented Nov. 7, 1871.

Witnesses:
Ernst Bilhuber
C. Wahlers

Inventor:
Hermann Lutz
Van Santvoord & Hauff
attys

UNITED STATES PATENT OFFICE.

HERMAN LUTZ, OF NEW YORK, N. Y.

IMPROVEMENT IN FOLDING CARRIAGES FOR CHILDREN.

Specification forming part of Letters Patent No. 120,757, dated November 7, 1871.

*To all whom it may concern:*

Be it known that I, HERMAN LUTZ, of the city, county, and State of New York, have invented a new and Improved Folding Vehicle; and I do hereby declare the following to be a full, clear, and exact description thereof, which will enable those skilled in the art to make and use the same, reference being had to the accompanying drawing forming part of this specification, and in which—

Figure 1:
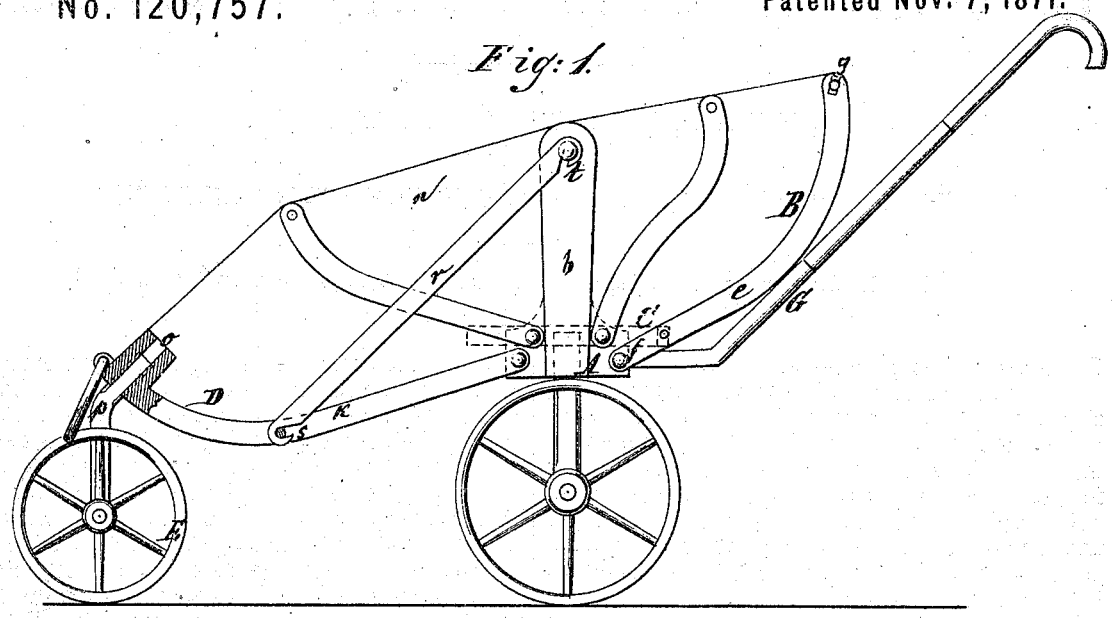
Figure 2:
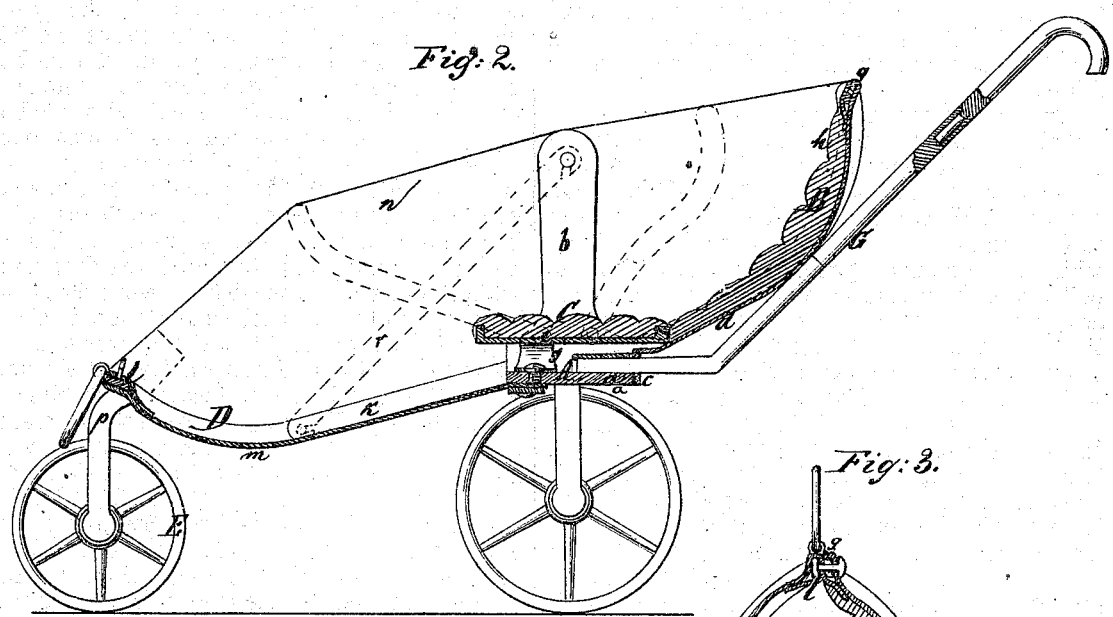
Figure 3:
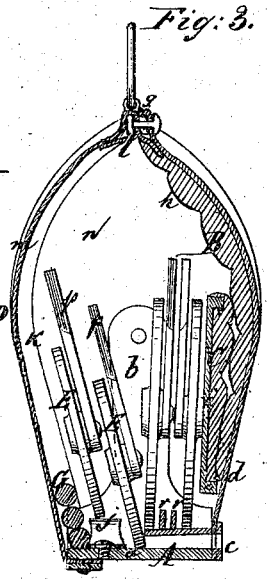

Figure 1 represents a sectional side view of this invention. Fig. 2 is a longitudinal vertical section of the same when unfolded ready for use. Fig. 3 is a similar section of the same when folded up.

Similar letters indicate corresponding parts.

This invention consists in the arrangement of one or more detachable or folding front wheels or runners in combination with a folding body and two detachable hind wheels or runners in such a manner that a vehicle is obtained which, when extended and rigged up for use, can be propelled with convenience over obstructions, such as occur, for instance, in the streets of a city, while the vehicle allows of being folded up in a small compass ready to be transported or stowed away with convenience. The invention consists further in the arrangement of a seat hinged to the folding body of the vehicle, and supported when in use by a spring or springs fastened to said body in such a manner that a convenient seat is obtained without requiring springs in its interior, and that said seat when folded up takes but little room. The invention consists also in the arrangement of braces in combination with the body of the vehicle and with the hinged foot-rest and with the front wheels or runners in such a manner that, when the hind wheels or runners are raised from the ground the foot-rest is prevented from folding up, said braces being so constructed that the same can either be detached or folded up when the vehicle is to be folded.

In the drawing, A designates the body of my vehicle, which consists of a flat plate, *a*, from the ends of which rise standards *b*. The rear edge of the body-plate *a* is turned up to form a flange, *c*, to which is attached a piece, *d*, of leather or other flexible material, that forms the outside covering of the back-rest B. The frame of this back-rest is composed of two curved bars, *e*, which are connected at their bottom ends by pivots *f*, to the body-standards *b*, (see Fig. 1,) while their upper ends are connected by a cross-bar, *g*, the covering *d* being fastened to the side-bars *e* and top bar *g*. From this top bar extends the lining *h* of the back-rest, and this lining continues to form the top of the seat C. This seat is supported by a frame, *i*, the rear bar of which is provided with gudgeons turning in sockets in the side bars *e* of the back-rest, so that the seat can be turned down to the position shown in Fig. 2, or that it can be turned up to the position shown in Fig. 3. In order to reduce the thickness of the seat no springs are placed in its body; but when the seat is turned down it rests on one or more springs, *j*, which are secured to the body-plate *a*. By this arrangement sufficient room is preserved in the interior of the vehicle, when the same is folded, for the reception of the wheels or runners and of the push-handle, as will be hereinafter more fully explained. To the front part of the body A is attached the foot-rest D, which consists essentially of two curved side-bars, *k*, pivoted at their inner ends to the uprights *b*, and connected at their outer ends by a cross-bar, *l*, thus forming a hinged frame, to which the covering *m* is secured. On the sides of the back and foot rests are secured pieces *n* of cloth or other suitable flexible material, which, when said parts are folded, form the sides of the vehicle, as shown in Figs. 1 and 2. The front ends of the side bars *k* of the foot-rest are provided with sockets *o* to receive the ends of the standards *p*, (see Fig. 1,) which form the bearings for the axles of the front wheels or runners E. In the rear flange *c* of the body-plate is also a socket to receive the end of the push-handle G, which is made in sections, so that it can be readily taken apart and placed in the interior of the vehicle when the same is folded up, as shown in Fig. 3. When the vehicle is unfolded the frame of the foot-rest is connected to the uprights *b* of the body A by braces *r*, which may be hooked on pins *s t*, as shown in Fig. 1, so that they can be readily taken off when the vehicle is to be folded; or said braces may be connected to the ends of the side-bars *k* and to the uprights *b* by hinge-joints, and in this case they (the braces) will have to be made each in two parts, joined in the middle like the joints of an ordinary carriage-top, so that the same when extended will hold the foot-rest firmly in position, and that when the vehicle is to be folded the braces will fold up with the same. By means of these braces the foot-rest is prevented from folding up when the hind wheels or runners are raised from the ground; for instance, in passing to and from the sidewalks in crossing streets it is necessary that the front part of the vehicle shall be let down on the front wheels or runners, and then the hind wheels or runners are raised from the ground, thus throwing the weight of the vehicle on the front wheels or runners, and whenever this takes place the foot-rest, if not supported by the braces $r$, would be liable to fold up. When the vehicle is folded up, as shown in Fig. 3, it resembles a traveling-bag or satchel, and in this form it can be conveniently transported or stowed away. It must be remarked that the front wheels or runners, instead of being so constructed that they can be removed, could be made to fold in when the vehicle is folded up.

What I claim as new, and desire to secure by Letters Patent, is—

1. The front wheels or runners E secured to detachable or folding standards, in combination with the folding body A of a vehicle, and with the detachable hind wheels or runners F, substantially as described.

2. The braces $r$, in combination with the folding body A of a vehicle and its front and hind wheels or runners, substantially as described.

3. The hinged seat C, in combination with the body A, spring or springs $j$, hinged back-rest B, and hinged foot-rest D, all constructed and operating substantially in the manner herein set forth.

HERMAN LUTZ.

Witnesses:
W. HAUFF,
E. F. KASTENHUBER. (31)